United States Patent Office 2,719,154
Patented Sept. 27, 1955

2,719,154
TRIAZINE VAT DYES

Mario Scalera, Somerville, N. J., and Ramon A. Gadea, Marietta, Ohio, assignors to American Cyanamid Company, New York, N. Y., a corporation of Maine No Drawing. Application May 23, 1951,
Serial No. 227,943

1 Claim. (Cl. 260—249)

This invention relates to a new triazine vat dye having the following formula

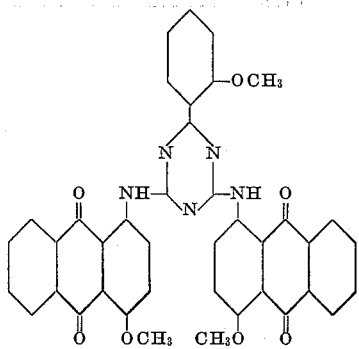

The above triazine compound is useful both as a vat dye and as a pigment and it has certain inherent properties which are peculiar characteristics thereof and which render it advantageous in such commercial uses thereof, as is fully hereinafter described.

In particular, the vat dye of the present invention gives very bright shades of red at all concentrations and builds up well on the fabric to a deep true red which is unusual in vat dyes. The dye fills a need for a true red dye with good fastness and satisfactory dyeing properties. None of the red vat dyes known in the past combine all of these properties to a marked extent and, hitherto, this has represented a color which has not been available in fast good dyeing vat dyes.

The desirable characteristics which have been set out above are unique with the particular dyestuff of the present invention. Even isomers in which the methoxy group on the phenyl radical is moved to the meta or para position give orange dyestuffs instead of the true red dye of the present invention. Similarly, replacing the methoxy group by methyl, ethyl or even by its next higher homolog ethoxy, also produces scarlet to orange dyestuffs and not a true red. Similarly, inferior or worthless products are obtained if the phenyl ring carries a second substituent in addition to the o-methoxyl group. If the methoxyl groups of the anthraquinone nuclei are replaced by their next higher homolog, ethoxyl, the resulting dyestuff is substantially worthless because it has very low color value. No reason has as yet been discovered why the homologs and position isomers of the dyestuff of the present invention all give dyestuffs of such different colors and in many cases, of such worthless properties. This is an unusual phenomenon in vat dye chemistry, particularly with a dyestuff having a high molecular weight. The invention is therefore not limited to any theory of why the present dyestuff possesses such unique properties so different from its very close chemical relatives.

The product of the present invention is not only useful as a vat dyestuff, but also constitutes an excellent red-orange pigment showing superior compatibility with nitrocellulose lacquers and excellent resistance to solvent, acid and alkali bleed. The unusual shade and the excellent properties in the coating composition, including a high degree of light fastness, makes the dye of the present invention of unusual value as a pigment in automotive finishes permitting production of the so-called "cherry maroon" shades with really satisfactory light fastness. This popular color hitherto has suffered from the disadvantages of poor light fastness and off-shade fading.

While it is not intended to limit the present invention in its product aspect to any particular process of preparing the dye, it is of advantage that the dye can be produced simply and cheaply in excellent yield by condensing 2-o-methoxyphenyl-4,6-dichlorotriazine with two molecules of 1-amino-4-methoxyanthraquinone. Intermediates for the dyestuff are readily produced by well known procedures such as those described in U. S. Patents 2,407,161, 2,401,599 and 1,897,428, and in an article by Ostrogovich, Gazz. Chim. Italia 65, 229 (1935). The invention will be described in greater detail in the following specific examples, the parts being by weight. Some of the intermediates produced by well known processes are new chemical compounds. They will be described in separate examples.

Example 1.—o-Methoxybenzoyldicyandiamide

A slurry of 120 parts of acetone and 21 parts of dicyandiamide is cooled to 5–10° C. and treated with 26.4 parts of potassium hydroxide. The slurry is stirred at 0–5° C. until a slurry of the potassium salt is obtained, thereupon the mixture is cooled to below 0° C. and there is slowly added to it a solution of 34.1 parts of o-methoxybenzoyl chloride in 120 parts of acetone. Stirring is continued until the reaction mixture comes to room temperature. It is then diluted to approximately the volume of 1000 parts of water, and slowly acidified with approximately 14 parts of acetic acid. The product is stirred thoroughly, filtered, washed, and air dried.

Example 2.—o-Methoxybenzoylbiuret

A mixture of 80 parts of o-methoxybenzoyldicyandiamide, prepared as described in Example 1, 400 parts of water, and 67 parts of concentrated hydrochloric acid is gradually heated to reflux with stirring, and refluxed until biuret formation is complete. The slurry is then cooled to 0–5° C. and filtered. The product is washed with very dilute hydrochloric acid and air dried.

Example 3.—o-Methoxybenzoguanamide 53.4 parts of o-methoxybenzoylbiuret, prepared as in Example 2, is dissolved in a solution of 30.2 parts of potassium hydroxide in 600 parts of water, and stirred at room temperature for an extended period until the reaction is complete. The product is precipitated by careful acidification with approximately 21 parts of acetic acid, and then cooled and filtered.

Example 4.—2-(o-methoxyphenyl)-4,6-dichlorotriazine

A mixture of 10 parts of o-methoxybenzoguanamide, prepared as in Example 3, 21 parts of phosphorus pentachloride, and 46 parts of phosphorus oxychloride is refluxed to chlorinate the CO groups. The product is then drowned rapidly in about 800 parts of a mixture of ice and water, stirred vigorously, filtered, washed, and dried. It may be purified by dissolving in benzene, filtering, and evaporating to dryness.

*Example 5.—Condensation with 1-amino-4-methoxy-anthraquinone*

A mixture of 17.0 parts of 2-(o-methoxyphenyl)-4,6-dichlorotriazine, 33.6 parts of 1-amino-4-methoxyanthraquinone, and 396 parts of nitrobenzene is gradually heated to 105–110° C., and stirred at this temperature until condensation is complete. It is then cooled and filtered. The product is washed with nitrobenzene and alcohol, and dried at 60° C. The dyestuff thus prepared can be acid pasted in the usual manner from 96% sulfuric acid. It gives extremely bright dyeings, both in pink and deep red shades. Its light fastness is very good.

We claim:
The red dyestuff of the formula

References Cited in the file of this patent
FOREIGN PATENTS

| | | |
|---|---|---|
| 449,477 | Great Britain | 1935 |
| 637,937 | Germany | 1936 |
| 796,539 | France | 1936 |